(12) United States Patent
Matt et al.

(10) Patent No.: US 8,956,527 B2
(45) Date of Patent: Feb. 17, 2015

(54) METHOD FOR THE ELECTROCHEMICAL MACHINING OF A WORKPIECE

(75) Inventors: Patrick Matt, Marktoberdorf (DE);
Michael Riester, Dettingen (DE);
Johannes Schreiner, Memmingen (DE)

(73) Assignee: Kennametal Extrude Hone GmbH, Holzgunz (DE)

( * ) Notice: Subject to any disclaimer, the term of this patent is extended or adjusted under 35 U.S.C. 154(b) by 372 days.

(21) Appl. No.: 13/387,756

(22) PCT Filed: Aug. 2, 2010

(86) PCT No.: PCT/EP2010/061220
§ 371 (c)(1),
(2), (4) Date: Jan. 30, 2012

(87) PCT Pub. No.: WO2011/015559
PCT Pub. Date: Feb. 10, 2011

(65) Prior Publication Data
US 2012/0138480 A1 Jun. 7, 2012

(30) Foreign Application Priority Data
Aug. 5, 2009 (DE) .................. 10 2009 036 221

(51) Int. Cl.
*B23H 3/02* (2006.01)
*C25F 3/16* (2006.01)
(52) U.S. Cl.
CPC ... *B23H 3/02* (2013.01); *C25F 3/16* (2013.01)
USPC ..................... 205/646; 204/224 M
(58) Field of Classification Search
CPC .................. B23H 3/02; C25F 3/14
USPC .............. 204/224 M; 205/640, 646, 658, 659
See application file for complete search history.

(56) References Cited

U.S. PATENT DOCUMENTS

| 5,306,402 | A | 4/1994 | Frembgen |
| 6,231,748 | B1* | 5/2001 | Agafonov et al. ............ 205/645 |
| 6,402,931 | B1 | 6/2002 | Zhou et al. |
| 2005/0224367 | A1* | 10/2005 | Kortvelyessy et al. ....... 205/646 |
| 2006/0011492 | A1* | 1/2006 | Moeckl .......................... 205/643 |
| 2007/0199829 | A1* | 8/2007 | Azevedo et al. ............... 205/652 |

FOREIGN PATENT DOCUMENTS

| DE | 4227005 A1 | 2/1994 |
| JP | 4419689 | 8/1969 |
| JP | 44019689 Y1 | 8/1969 |
| JP | 419016 A | 1/1992 |

(Continued)

OTHER PUBLICATIONS

Jul. 1, 2014—OA—English.

*Primary Examiner* — Nicholas A Smith
(74) *Attorney, Agent, or Firm* — Matthew W. Smith, Esq.

(57) ABSTRACT

The invention relates to a method for electrochemical processing of at least one workpiece, comprising at least the following steps: a) setting a first flow density during a first phase in an electrolyte, b) retaining the first flow density during a second phase following the first phase, c) increasing the first flow density during a third phase following the second phase to a second flow density at least 30% greater than the first flow density, and d) reducing the second flow density during a fourth phase following the third phase within a maximum of 100 microseconds to a maximum of 1% of the second flow density.

9 Claims, 2 Drawing Sheets

(56) References Cited

FOREIGN PATENT DOCUMENTS

| | | |
|---|---|---|
| JP | 04019016 A | 1/1992 |
| JP | 2002534277 A | 10/2002 |
| JP | 2004216542 A | 8/2004 |
| WO | 0040362 | 7/2000 |
| WO | 02090030 A1 | 11/2002 |
| WO | 03082504 A1 | 10/2003 |

* cited by examiner

METHOD FOR THE ELECTROCHEMICAL MACHINING OF A WORKPIECE

BACKGROUND OF THE INVENTION

1. Field of the Invention

The present invention relates to a method for the electrochemical machining of at least one workpiece, in which the workpiece is treated in different phases with a current flow which has different current densities during the different phases.

2. Description of the Related Art

Electrochemical machining (ECM) is a method for removing metal by electrochemically detaching the metal from the surface of an anodically polarized, metallic workpiece, which is a component part of an electrochemical cell. The method is based on the controlled, anodic, electrochemical degradation of the surface of the metallic workpiece to be machined (anode) with a tool (cathode) in the electrochemical cell filled with an electrolyte, by electrolysis. Electrolysis is a chemical process in which an electric current flows between two electrodes (the positively charged anode and the negatively charged cathode) immersed in a solution, the electrolyte.

Typical examples of an anodic, electrochemical degradation of the surface of a metallic workpiece to be machined are electrochemical polishing (ECP), electrochemical deburring (ECD) and the already mentioned electrochemical machining. During electrochemical polishing, the surface of the metallic workpiece is removed. Electrochemical machining is often performed in different machining phases, during which the workpiece is treated with different current intensities.

DE 42 27 005 A1 discloses a method for the electrochemical machining of a workpiece in which an abrupt rise in current takes place between at least two machining periods. Here, a direct current flows between a tool and a workpiece. This current may be supplied in either a continuous or a pulsed manner. The method described in DE 42 27 005 A1 is used in particular for the deburring of workplaces.

During a first machining period, the current intensity is chosen there to be relatively low, in order to prevent overheating of the electrolyte. An initial current intensity of 0.5 A per millimeter of overall edge length of the workpiece to be machined has been found to reliably accomplish this. The machining time during the first machining period is 10% to about 40% of the overall machining time, which is often 1 to 3 seconds. Following this first machining period, the operating current is increased abruptly by a factor of 1.3 to 10. This abruptly increased current level is retained in a second machining period up to the end of the machining process, it being possible for further increases in the current level to follow during the machining period. With the method described here, it is intended to reduce the formation of electrical short-circuits.

With the electrochemical machining methods known from the prior art, it is known however that, particularly when sodium nitrate is used as the electrolyte, deposits occur on the workpiece and may lead to a passivation of the workpiece surface. Moreover, during electrochemical machining with current densities that are too low, discolorations and great surface roughnesses occur on the surfaces of the workpiece. Since, however, a high surface quality is desired, relatively high current densities must be used, which in turn is detrimental to machining accuracy. Although it is possible to improve the surface quality by a pulsed direct current, this leads to a slowing of the machining process because, between the individual current pulses, appropriate current capacitances first have to be built up by a current source. Moreover, continuous applications of great current intensities require correspondingly dimensioned current sources, which cause high costs in acquisition and during operation.

The object of the invention is therefore to solve at least partially the problems described with respect to the prior art and, in particular, to provide a method for the electrochemical machining of at least one workpiece that allows a high machining rate, is inexpensive to use and achieves a high surface quality of the workpiece.

SUMMARY OF THE INVENTION

These objects are achieved by a method according to the features of patent claim 1. Further advantageous refinements of the invention are specified in the dependently formulated patent claims. It should be pointed out that the features individually presented in the dependently formulated patent claims can be combined with one another in any desired, technologically meaningful way and define further refinements of the invention. In addition, the features specified in the patent claims are specified more precisely and explained in the description, further preferred refinements of the invention being presented.

The method according to the invention for the electrochemical machining of at least one workpiece comprises at least the following steps:

a) setting a first current density during a first phase in an electrolyte, b) retaining the first current density during a second phase, following the first phase, c) increasing the first current density during a third phase, following the second phase, to a second current density that is at least 30% higher in comparison with the first current density, and d) reducing the second current density during a fourth phase, following the third phase, to a maximum of 1% of the second current density within a maximum of 100 microseconds (µs).

Method step a) expresses the idea in particular that, in the first phase, a first current density is set between a workpiece and a tool in the electrolyte. Current density is understood here as meaning the ratio of the current intensity in amperes to the product of a free cathode area in square millimeters and the ratio of a machining area of the workpiece and the free cathode area:

$$\bar{I} = \frac{I}{A_1 \times \frac{A_2}{A_1}}$$

where: $\bar{I}$=mean current density with respect to the free cathode area

I=current [A]

$A_1$=free cathode area [mm$^2$]

$A_2$=machining area [mm$^2$]

The free cathode area is the sum of all the areas of a cathode over which a current flow between the workpiece to be machined and the cathode passes when an electrical voltage is applied. The machining area of the workpiece is the sum of all the areas of the workpiece in which a chemical reaction takes place as a result of the current flow. All fluids that conduct electric current when a voltage is applied, under the influence of the electric field thereby created, can be used as the electrolyte, sodium nitrate being used here with preference. The setting of the first current density may take place on the basis of any desired initial current density. However, a setting of the first current density on the basis of an initial current density of 0 A/mm² or with an initial current density that corresponds to the current density with which the last machining cycle was ended is preferred. Initial current density means here that current density in the electrolyte that exists between a workpiece and a tool before the beginning of method step a). The adaptation of the initial current density to the first current density may take place linearly, degressively or progressively. With preference, the first current density is less than 0.8 A/mm², whereby it is ensured that the expenditure on apparatus for sustainably carrying out this method is acceptably low and that a lower surface roughness is achieved than with methods known from the prior art.

According to method step b), this first current density is kept substantially constant during a second phase, following the first phase, in particular directly following, it being possible for regular fluctuations of the current density amounting to ±10%, with preference ±5% and with particular preference ±2%, to be tolerated. During this second phase, the main removal of material from the workpiece often takes place.

Between method steps b) and c), it may be advantageous to increase the electrolyte pressure and/or the electrolyte flow in the gap. An improved cooling of the machining space can be achieved in this way. The lead before step c) may be, for example, several seconds, but may also occur simultaneously with step c).

According to method step c), the first current density is increased during a third phase, following the second phase, in particular directly following, to a second current density that is at least 30%, with preference at least 50%, with particular preference at least 100%, higher in comparison with the first current density.

With preference, the second current density should in this case be at least 0.8 A/mm². The increasing of the current density is performed here with preference abruptly, i.e. the rise in the current density in dependence on the time (t) should be as high as possible. This abrupt increase in the first current density to a second current density that is at least 30% higher in comparison with the first current density brings about a polishing of the surface of the workpiece. The third phase ends with the reaching of the second current density.

In accordance with method step d), with preference, directly following the third phase, the second current density is reduced during a fourth phase to a maximum of 1% of the second current density, with preference substantially 0 A/mm², within 10 to 100 microseconds (µs), with preference 30 to 80 microseconds (µs), with particular preference (for example in the case of a second current intensity of 0.8-1.0 A/mm²) substantially 50 to 60 microseconds (µs). It has been found that an extremely high surface quality is obtained on the workpiece by this quick and active reduction of the second current density to a current density of substantially 0 A/mm². In particular, the passivation and discoloration of the workpiece surface are prevented.

In the case of the method proposed here, it is also regarded as advantageous that the first current density during the second phase is between 0.3 A/mm² and 0.7 A/mm², with preference 0.4 A/mm² and 0.6 A/mm², with particular preference substantially 0.5 A/mm². This current density has the effect that a high amount of material is removed from the workpiece, and consequently a high machining rate is achieved.

It is also regarded as advantageous that the second current density of the third phase (at least at the end) is at least 0.5 A/mm², with preference at least 0.8 A/mm². As from this current density, a particularly high surface quality is achieved by particularly effective polishing of the workpiece.

In the case of another development of the invention, the reduction of the second current density in the fourth phase is performed by a voltage reversal. Such a voltage reversal in the form of a polarity reversal of the tool and of the workpiece (cathode and anode) has the effect that a particularly rapid reduction of the second current density to substantially 0 A/mm² can be achieved even when the technical properties of a current source that is used do not allow such a strong reduction of the second current density within the required time under normal conditions. To achieve this, a second current with a negative potential may be added in particular here. With preference, this second circuit has a generator with a continuous rating of (at least) 400 amperes and a short-time rating of (at least) 1000 amperes for (at least) one second. With preference, a maximum of ten pulses are generated with this second circuit during the fourth phase.

In a further preferred embodiment of the invention, the second current density is kept substantially partially constant during method step c). Nevertheless, the current density may also be kept substantially constant for a time between method step c) and method step d). The length of the time has an influence on the achievable surface quality, such as roughness, coloration and brightness, and can be adapted to the requirements.

In a development of the invention it is provided that the machining time during the second phase is greater than the sum of the machining times during the other phases.

The individual phases may have, in particular, the following lengths:
first phase: 100 µs to 500 µs,
second phase: 10 milliseconds to 100 seconds,
third phase: a maximum of 1 second constantly or a total of a maximum of 1 second pulsed; and
fourth phase: a maximum of 70 µs.

BRIEF DESCRIPTION OF THE DRAWINGS

The invention and the technical environment are explained in more detail below on the basis of the figure. It should be pointed out that the figure shows a particularly preferred configurational variant of the invention, but the invention is not restricted to it. In the figures.

DETAILED DESCRIPTION OF THE INVENTION

Figure 1:
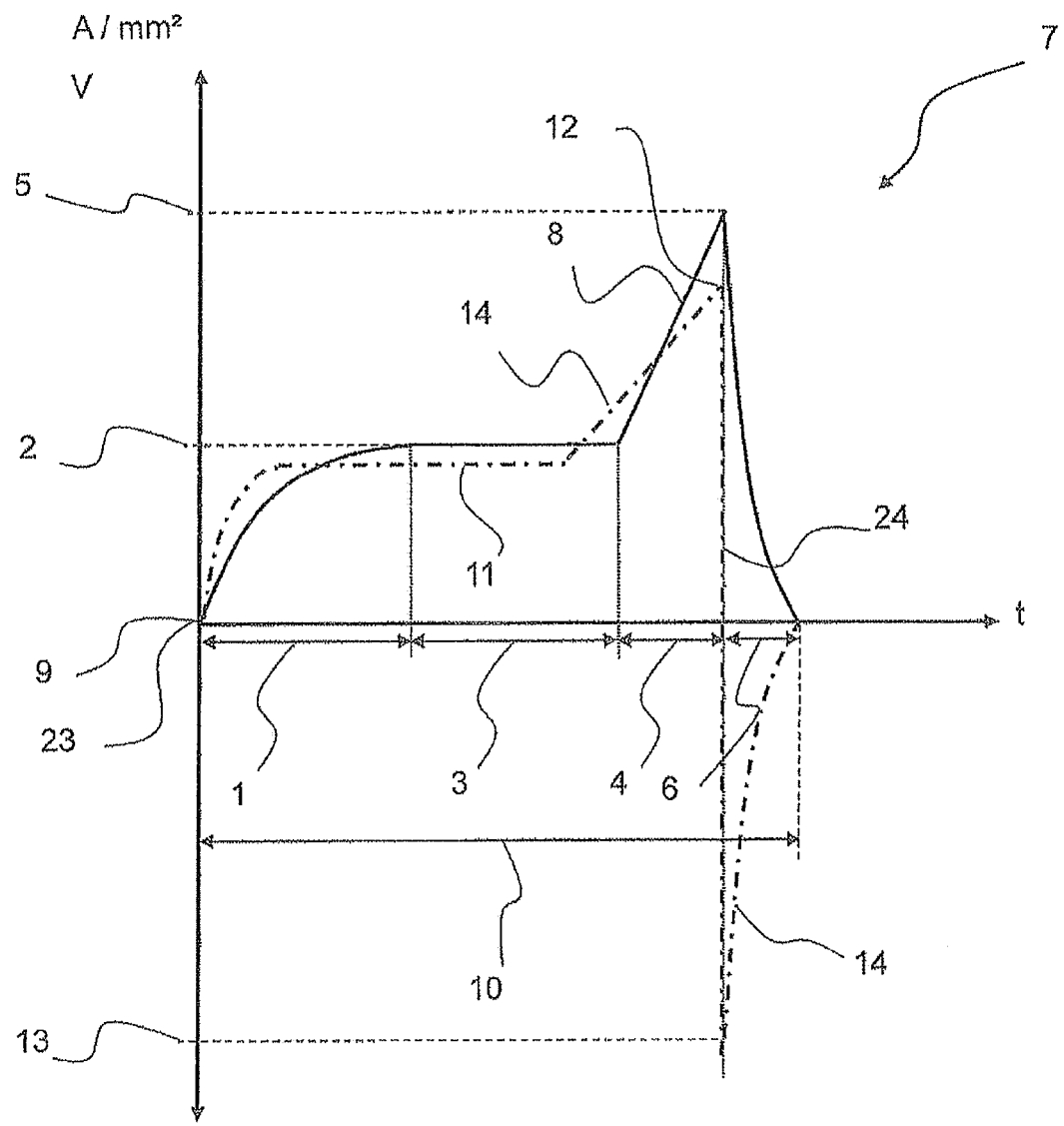
FIG. 1 schematically shows the variation of the current density during a machining cycle, and FIG. 2 schematically shows an illustration of the conditions when carrying out a method for the electrochemical machining of at least one workpiece.

FIG. 1 presents a diagram 7 which shows the current density variation 8 (solid line) and the voltage variation 14 (dash-dotted line) in dependence on the machining time t. Here, the y axis of the diagram 7 indicates the current density in A/mm² [amperes per square millimeter] or the voltage in V [volts] and the x axis of the diagram 7 indicates the machining time t.

The diagram 7 shows a first phase 1, during which the current density variation 8 rises from an initial current density 9 (here: substantially 0 A/mm²) (degressively) to a first current density 2 at the end of the first phase 1, and the voltage variation 14 rises from an initial voltage 23 (here: substantially 0 volts) (degressively) to a first voltage 11 at the end of the first phase 1. The origin of the diagram 7 here represents the initial current density 9 amounting to 0 A/mm² and the initial voltage 23 amounting to 0 volts at the beginning of the machining cycle 10. Once the first current density 2 has been reached at the end of the first phase 1 and the first voltage 11 has been reached at the end of the first phase 1, or even before the end, the second phase 3 begins. In this second phase 3, the first current density 2 is retained, and so the current density profile 8 neither rises nor falls within the second phase 3. The first voltage 11 is also retained in the second phase 3 up to the end of the second phase 3 or until shortly before the end of the second phase 3, and so the voltage variation 14 neither rises nor falls within the second phase 3 or until just before the end of the second phase 3. The second phase 3 is followed by the third phase 4, during which the first current density 2 is increased abruptly to a second current density 5, which is at least 30% higher in comparison with the first current density 2. The first voltage 11 is also increased in this third phase 4 to a second voltage 12. The third phase 4 is followed by the fourth phase 6, during which the second current density 5 is reduced to 0 A/mm² within a maximum of 100 μs. At the beginning of the fourth phase 6 (or at the end of the third phase 4) a voltage reversal 24 takes place to a third voltage 13, the third voltage 13 being reduced during the fourth phase 6 to 0 volts within a maximum of 100 μs.

Accordingly, the method according to the invention can also be identified or (machine) controlled on the basis of the corresponding voltage variation, as it is specified here by way of example for the preferred exemplary embodiment.

Figure 2:
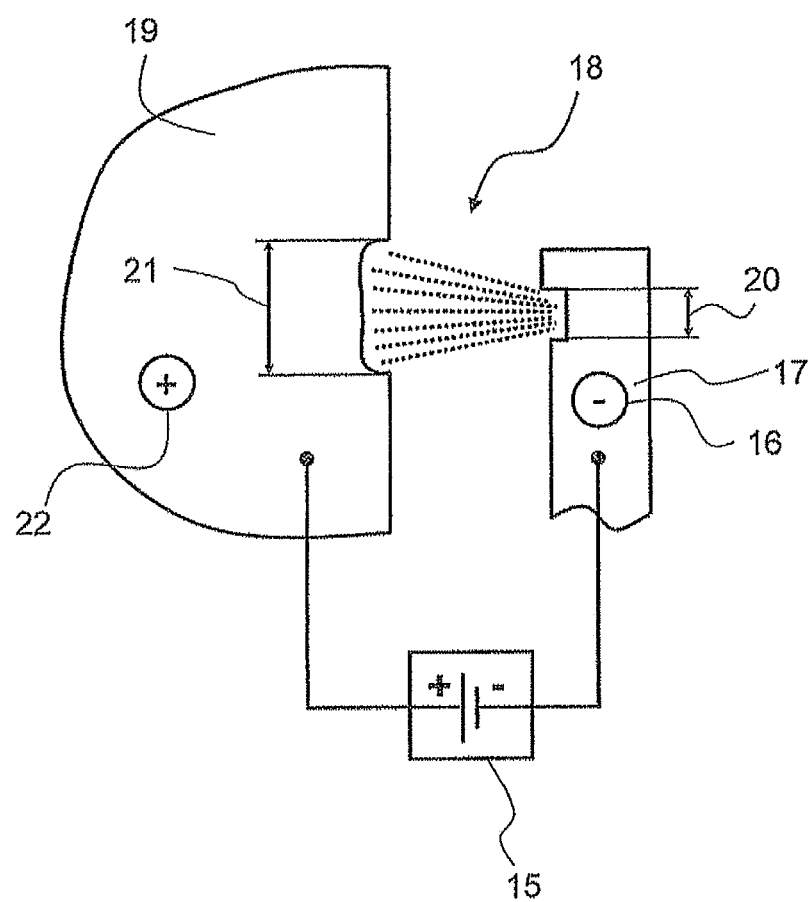

FIG. 2 shows an exemplary embodiment of a device for carrying out a method for the electrochemical machining of at least one workpiece 19 and serves in particular for illustrating the situation in the gap. For this purpose, a current source 15 is connected in an electrically conducting manner to the workpiece 19 (anode 22) and a tool 17 (cathode 16). Formed between this workpiece 19 and the tool 17 is a gap 18, which defines the distance between the workpiece 19 and the tool 17. An electrolyte that is not represented here is arranged in this gap 18. The tool 17 has a free cathode area 20, over which a current flow (represented here by dashed lines) passes to the workpiece 19 when a voltage is applied by the current source 15. A detachment of metal thereby takes place in a region of a machining area 21 of the workpiece 19.

The method for electrochemical machining according to the invention is distinguished by a high machining rate together with a high surface quality of the machined workpiece and is at the same time inexpensive to use.

The invention claimed is:

1. A method for the electrochemical machining of at least one workpiece, comprising at least the following steps:
    a) setting a first current density during a first phase in an electrolyte,
    b) retaining the first current density during a second phase, directly following the first phase,
    c) increasing the first current density during a third phase, directly following the second phase, from the first current density to a second current density that is at least 30% higher in comparison with the first current density, and
    d) reducing the second current density during a fourth phase, following the third phase, to a maximum of 1% of the second current density within a maximum of 100 microseconds,
    wherein a positive, non-zero current density is present within the electrolyte from the first phase through the third phase.

2. The method as claimed in claim 1, wherein at least an electrolyte pressure or an electrolyte flow is increased between steps b) and c).

3. The method as claimed in claim 1, wherein the first current density during the second phase is between 0.3 A/mm² and 0.7 A/mm².

4. The method as claimed in claim 1, wherein, the second current density in the third phase is at least 0.5 A/mm².

5. The method as claimed in claim 1, wherein the reduction of the second current density in the fourth phase is performed by a voltage reversal.

6. The method as claimed in claim 1, wherein the second current density is partially constant during method step c).

7. The method as claimed in claim 1, wherein the machining time during the second phase is greater than the sum of the machining times during the other phases.

8. The method of claim 1, wherein the first phase is of a length of 100 μs to 500 82 s.

9. The method of claim 1, wherein the second phase is of a length of 10 ms to 1 s.

* * * * *